(12) United States Patent
Eidt

(10) Patent No.: US 6,295,640 B1
(45) Date of Patent: Sep. 25, 2001

(54) METHOD AND APPARATUS FOR DISTINGUISHING REFERENCE VALUES FROM NON-REFERENCE VALUES IN A RUNTIME ENVIRONMENT

(75) Inventor: Erik L. Eidt, Campbell, CA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/075,455

(22) Filed: May 8, 1998

(51) Int. Cl.$^7$ ........................................... G06F 9/44
(52) U.S. Cl. .................. 717/4; 717/5; 707/206; 711/132
(58) Field of Search .................. 717/4, 5, 10; 707/206; 711/154, 170, 173, 132, 129, 100; 712/216, 228, 202

(56) References Cited

U.S. PATENT DOCUMENTS

| | | | |
|---|---|---|---|
| 4,150,430 | * 4/1979 | Gusev et al. | 711/213 |
| 4,797,810 | * 1/1989 | McEntee et al. | 707/206 |
| 4,912,629 | * 3/1990 | Shuler, Jr. | 707/206 |
| 4,951,194 | * 8/1990 | Bradley et al. | 711/132 |
| 4,989,134 | * 1/1991 | Shaw | 707/206 |
| 5,321,834 | * 6/1994 | Weiser et al. | 707/206 |
| 5,428,793 | * 6/1995 | Odnert et al. | 717/9 |
| 5,530,866 | * 6/1996 | Koblenz et al. | 717/8 |
| 5,878,261 | * 3/1999 | Holler et al. | 717/9 |
| 5,900,001 | * 5/1999 | Wolczko et al. | 707/206 |
| 5,909,579 | * 6/1999 | Agesen et al. | 717/4 |
| 5,920,876 | * 7/1999 | Ungar et al. | 707/206 |
| 5,963,982 | * 10/1999 | Goldman | 711/170 |
| 6,047,125 | * 4/2000 | Agesen et al. | 717/9 |
| 6,093,216 | * 7/2000 | Adl-Tabatabai et al. | 717/3 |
| 6,101,580 | * 8/2000 | Agesen et al. | 711/132 |

* cited by examiner

Primary Examiner—Tuan Q. Dam
(74) Attorney, Agent, or Firm—Blakely, Sokoloff, Taylor & Zafman

(57) ABSTRACT

A method and apparatus for distinguishing reference values from non-reference values in a runtime environment is described. A set of volatile registers and a set of non-volatile registers are statically determined. The set of volatile registers is partitioned into reference and non-reference register partitions statically. The set of non-volatile registers is partitioned into reference and non-reference partitions dynamically.

32 Claims, 7 Drawing Sheets

METHOD AND APPARATUS FOR DISTINGUISHING REFERENCE VALUES FROM NON-REFERENCE VALUES IN A RUNTIME ENVIRONMENT

FIELD OF THE INVENTION

The present invention relates to runtime environments for computer systems; more particularly, the present invention relates to an a runtime environment that distinguishes reference values from non-reference values.

BACKGROUND OF THE INVENTION

Many prior art runtime environments provide partitioning of registers into volatile registers and non-volatile registers. The partition of registers into volatile and non-volatile is typically performed once and is not subsequently changed. Volatile registers are typically used to pass parameters during subroutine calls and returns, provided the parameters fit. Parameters that do not fit in the volatile registers are passed in memory. Non-volatile registers store information that is maintained across subroutine calls. If a subroutine uses a non-volatile register, the subroutine saves the value stored in the non-volatile register and restores the value prior to returning to the calling routine.

Rigid partitioning of registers into volatile and non-volatile partitions provides predictability as to what registers are to be saved by called routines and what registers are to be saved by calling routines. However, rigid partitioning of registers does not provide information as to which registers are used for references to objects memory and which registers are used for storing values used by a routine or subroutine. For this reason, conservative garbage collection is often used in runtime environments that provide rigid partitioning of registers.

Garbage collection is the automatic recovery of memory space that is no longer required by a computation, routine or subroutine. Thus, garbage is the memory space that has been used, but is no longer required by a computation, routine or subroutine that has not yet been reclaimed by the memory manager of the runtime environment. Conservative garbage collection is based on an algorithm that overestimates the amount of live data in memory where garbage collection takes place. Conservative garbage collection is typically used where a compiler provides little support as to registers and memory locations that provide pointers to objects in memory.

Because overestimation of live data in memory (i.e., conservative garbage collection) results in sub-optimal memory management, support for non-conservative (perfect) garbage collection is desirable. A non-conservative garbage collector can take one of two forms. A non-copying collector that requires that unique references from a stack to a heap be identified so that heap objects that are in use are not accidentally collected. Alternatively, a copying collector additionally requires that non-unique references be identified so that they can be modified if the item referenced moves.

Some prior art runtime environments have provided support for garbage collection by providing tags that indicate whether a register or stack entry is a reference value or a non-reference value. However, maintaining tags increases the overhead required for memory management and in some cases reduces the number of bits available to represent data by using a most significant or least significant bit as a tag.

Prior art runtime environments have also provided support for garbage collection by providing a rigid reference/non-reference partitioning of registers. For example, the 68000 microprocessor available from Motorola, Inc. of Schaumburg, Ill. provides 16 data (non-reference) and 16 address (reference) registers. Runtime environments based on the 68000 provide 16 data and 16 address registers. Rigid reference/non-reference partitioning, however, is not based on the needs of a particular routine or subroutine, and therefore can provide sub-optimal register partitioning.

What is needed is a runtime environment that supports non-conservative garbage collection without the overhead associated with tags or tables to designate reference and non-reference values. The present invention provides such a runtime environment by providing volatile and non-volatile registers, each of which is further partitioned into reference and non-reference registers. The reference/non-reference partitioning of non-volatile registers is accomplished dynamically.

SUMMARY OF THE INVENTION

A method and apparatus for distinguishing reference values from non-reference values in a runtime environment is described. A set of volatile registers and a set of non-volatile registers are statically determined. The set of volatile registers is partitioned into reference and non-reference register partitions statically. The set of non-volatile registers is partitioned into reference and non-reference partitions dynamically.

BRIEF DESCRIPTION OF THE DRAWINGS

The present invention is illustrated by way of example, and not by way of limitation, in the figures of the accompanying drawings in which like reference numerals refer to similar elements.

DETAILED DESCRIPTION

Figure 1:
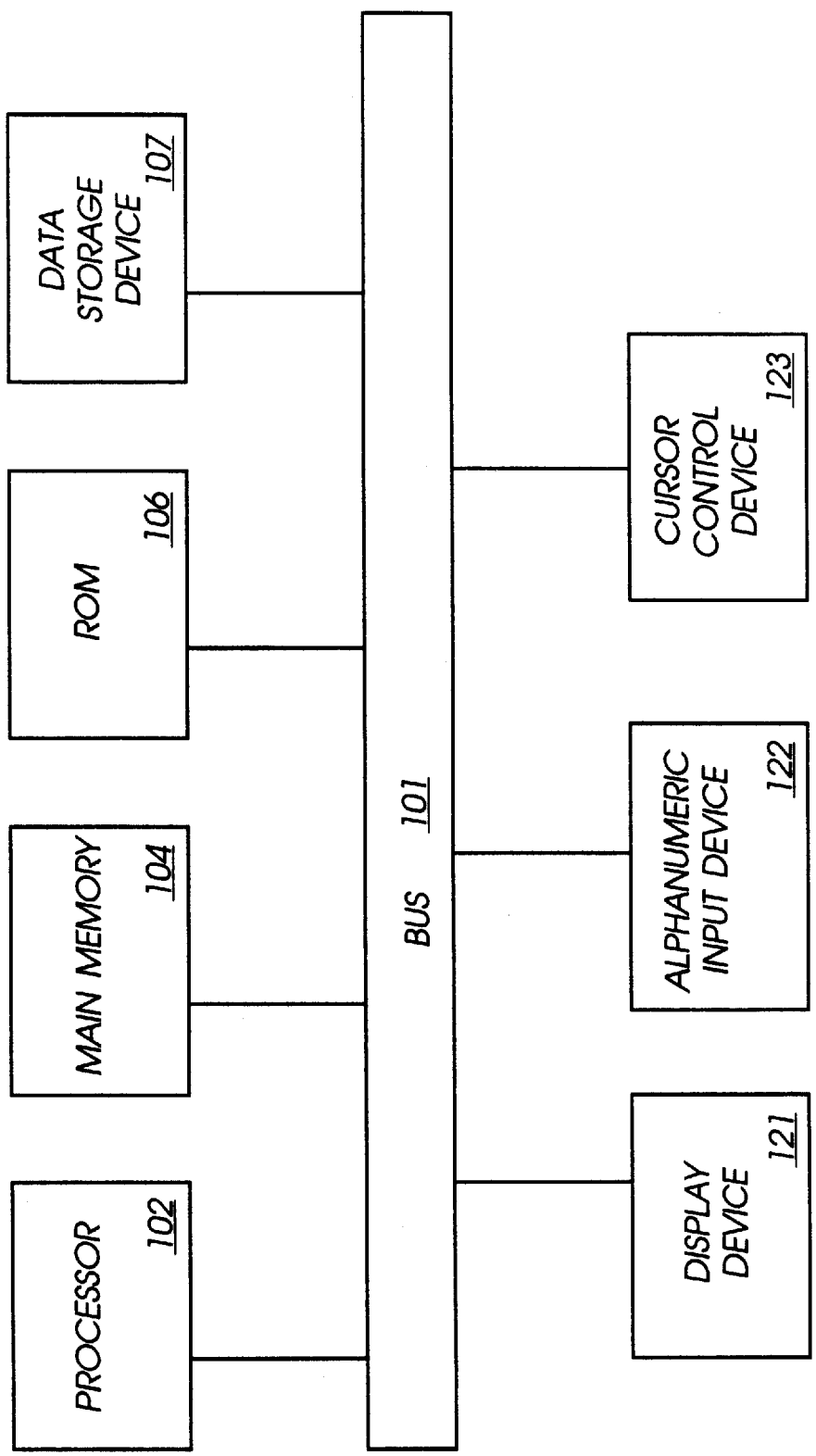
FIG. 1 is one embodiment of a computer system.

A method and apparatus for distinguishing reference values from non-reference values in a runtime environment is described. In the following description, for the purposes of explanation, numerous specific details are set forth in order to provide a thorough understanding of the present invention. It will be apparent, however, to one skilled in the art that the present invention can be practiced without these specific details. In other instances, well-known structures and devices are shown in block diagram form in order to avoid obscuring the present invention.

Briefly, the runtime environment of the present invention partitions registers in to volatile and non-volatile registers. The runtime environment of the present invention further partitions registers into reference and non-reference registers. The four-way partitioning is used by garbage collection routines to positively identify reference registers and memory (e.g., stack) locations to support non-conservative garbage collection.

Partitioning of volatile registers into reference and non-reference registers is predetermined and is therefore static within the runtime environment. This enables a garbage collector to identify reference values in the volatile register set for a preempted thread without requiring external tables, thereby saving time and space.

Partitioning of non-volatile registers into reference and non-reference registers is performed dynamically at compile time for each routine or procedure. This enables a routine to use the registers of the non-volatile partition for reference or non-reference types as dictated by individual routine needs, thereby reducing total non-volatile register requirements, which in turn allows fewer registers to be pushed to the stack on entry to the routine and restored on exit. Furthermore, this reduces the need to use memory because register partitioning is tailored to the needs of the specific routine or subroutine and therefore provides a more efficient use of resources than rigid partitioning.

Because registers can change partition dynamically, a window of time can exist during which the contents of the registers and partitioning assignments are not consistent. That is, the reference/non-reference partitioning of both the caller routine and the callee routine are known; however, some of the registers contain values from the caller while some of the registers have been initialized to values for the callee routine. To support preemption during this window of time, in one embodiment the runtime environment of the present invention provides a stack frame that is divided into two half frames. As is described in greater detail below, the use of two half frames to provide a stack frame allows an interruptable calling convention that supports non-conservative garbage collection.

In one embodiment, the present invention is a byte code runtime environment. In such an environment, instructions are one byte in length. Of course, other instruction sizes can be used, but in a byte code-related environment all instructions are the same length. Also, data is stored in a consistent sized portion of memory, such as 32 bits. Larger numbers are stored in an array of 32-bit values.

Overview of Objects and Dispatching in a Runtime Environment

FIG. 1 is one embodiment of a computer system. Computer system 100 comprises bus 101 or other communication means for communicating information, and processor 102 coupled with bus 101 for processing information. In one embodiment, processor 102 is a Reduced Instruction Set Computing (RISC) processor having a set of general purpose registers. Computer system 100 further comprises random access memory (RAM) or other dynamic storage device 104 (referred to as main memory), coupled to bus 101 for storing information and instructions to be executed by processor 102. Main memory 104 also can be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions. Data storage device 107 can be, for example, magnetic disk and/or an optical disc and corresponding drive(s). Data storage device 107 can also include other types of data storage devices.

Computer system 100 can also be coupled via bus 101 to display device 121, such as a cathode ray tube (CRT) or liquid crystal display (LCD), for displaying information to a computer user. Alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121.

The present invention is related to the use of computer system 100 to distinguish reference values from non-reference values in a runtime environment. According to one embodiment, distinguishing reference values from non-reference values is performed by computer system 100 in response to processor 102 executing sequences of instructions contained in memory 104. Execution of the sequences of instructions contained in memory 104 causes processor 102 to distinguish reference values from non-reference values, as will be described hereafter. Instructions are provided to main memory 104 from a storage device, such as magnetic disk, CD-ROM, DVD, via a remote connection (e.g., over a network), etc. In alternative embodiments, hard-wired circuitry can be used in place of or in combination with software instructions to implement the present invention. Thus, the present invention is not limited to any specific combination of hardware circuitry and software.

Figure 2:
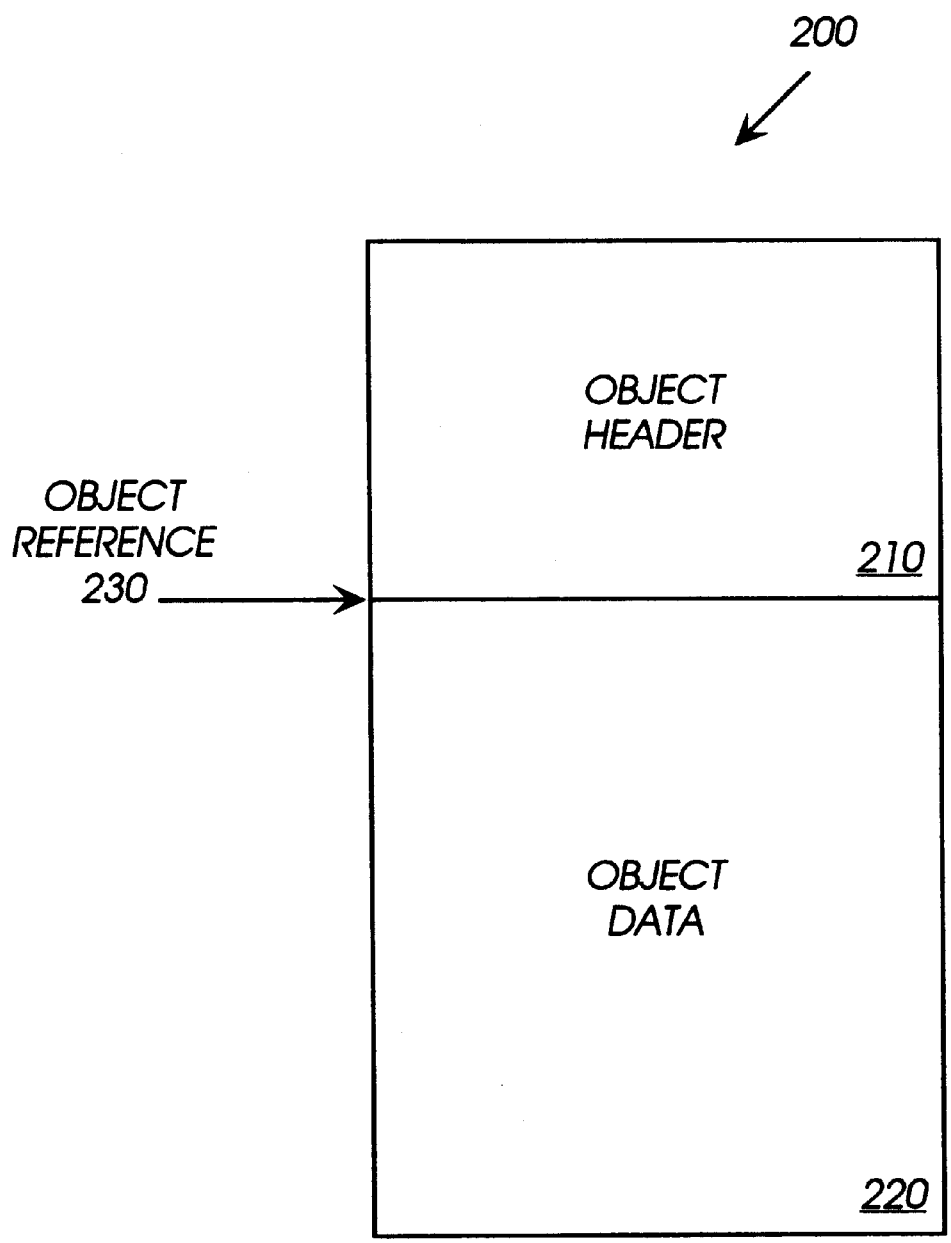
FIG. 2 is one embodiment of a layout for an object in a runtime environment.

FIG. 2 is one embodiment of a layout for an object in a runtime environment. In one embodiment, object 200 consists of a single object header 210 followed by object data 220. Object headers are discussed in greater detail below with respect to FIG. 4. Object reference 230 is a pointer to object 200. In general, objects are referred to by the address immediately after the object header. In other words, a valid object reference refers to the beginning of the object data, and only such a reference keeps the object alive.

The object can be, for example, a routine or a subroutine stored in main memory 104. A program executed by computer system 100 includes one or more objects. It is important to note that not all of the objects of a particular program must be stored in main memory 104 at the same time. Objects can be distributed across one or more of main memory 104, ROM 106, data storage device 107, or other storage devices.

Figure 3:
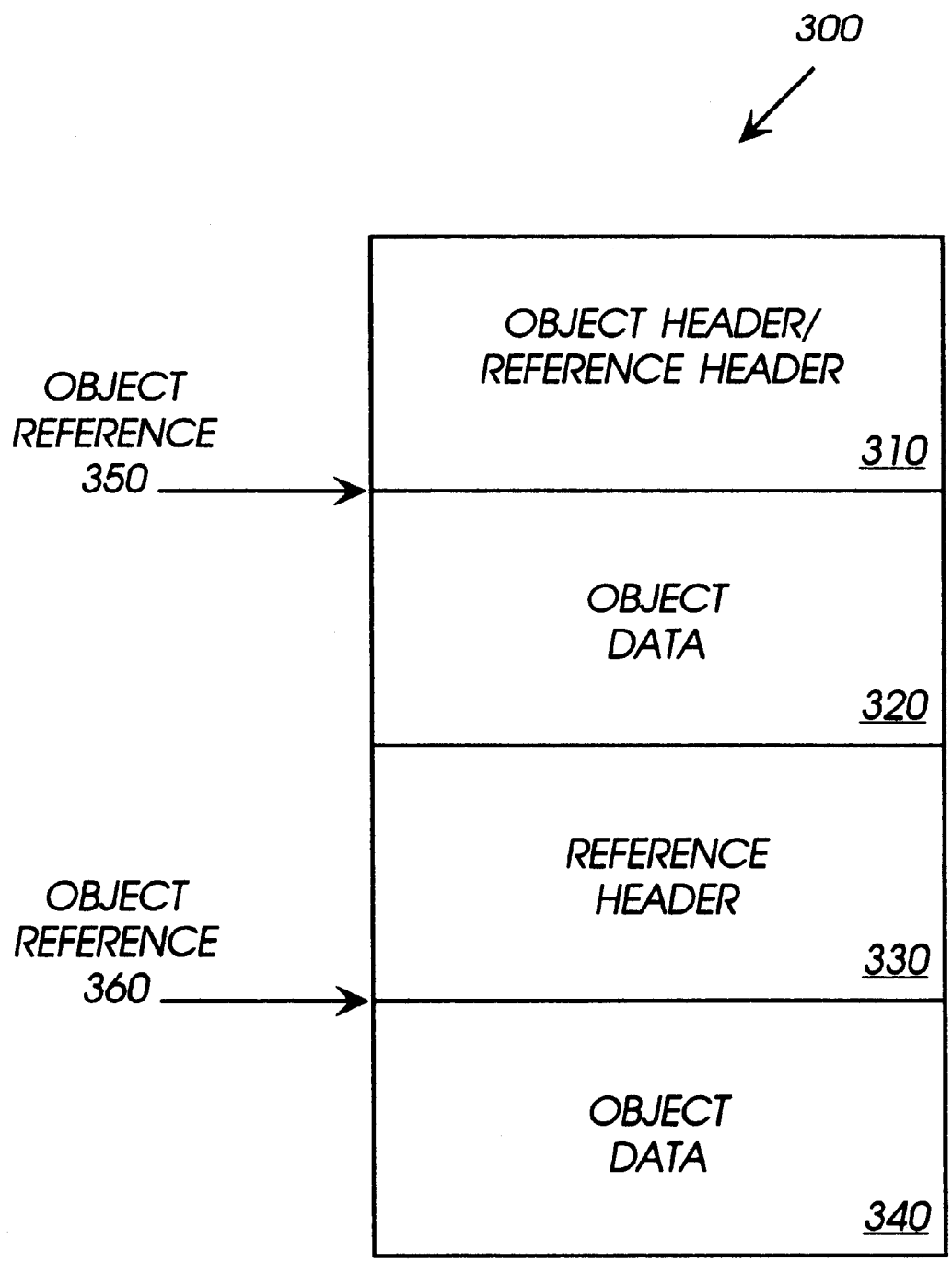
FIG. 3 is one embodiment of an alternative layout for an object in a runtime environment.

FIG. 3 is one embodiment of an alternative layout for an object in a runtime environment. The embodiment of FIG. 3 allows for multiple references to object 300. This is accomplished by distinguishing between object headers and reference headers. Object header/reference header 310 provides object information in a similar manner as object header 210 of FIG. 2. Object reference 350 is a pointer to the beginning of object data 320.

Reference header 330 is a header for a second reference to object 300 and provides information for the associated reference. Object reference 360 is a pointer to the beginning of object data 340. Of course, more than two references to an object can be provided in a similar manner. Multiple references to an object can be used to improve interface dispatch performance and to provide support for multiple inheritance within a runtime environment.

Figure 4:
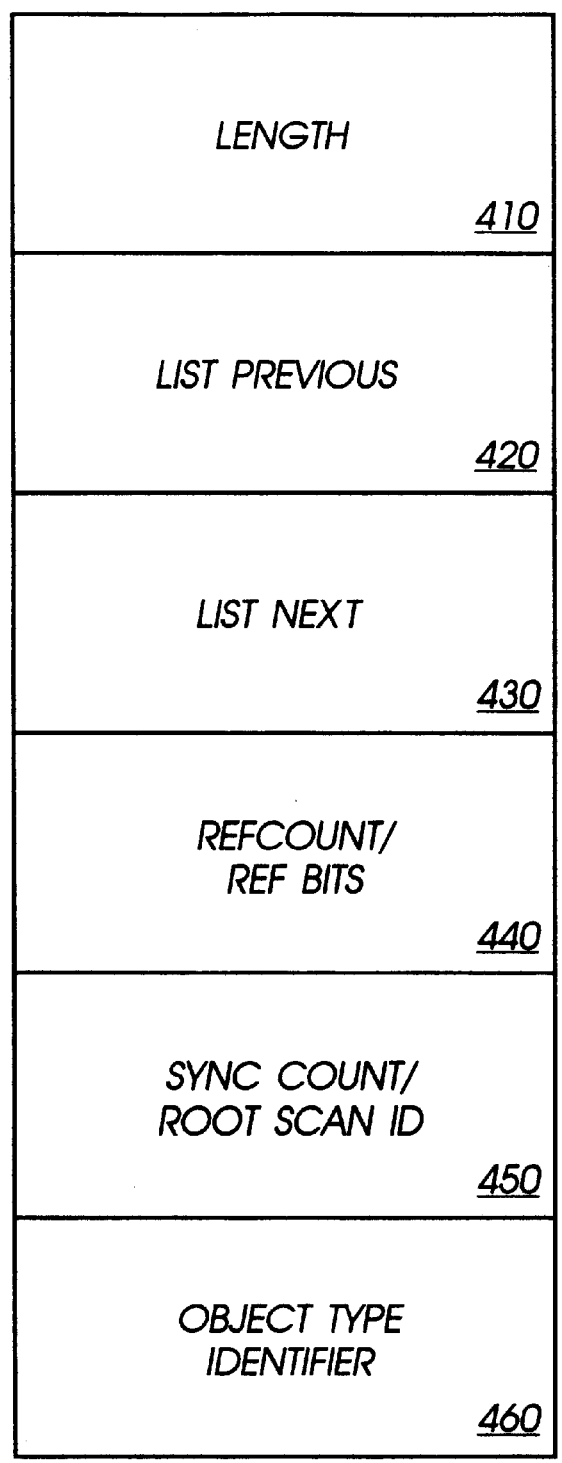
FIG. 4 is one embodiment of an object header for an object in a runtime environment.

FIG. 4 is one embodiment of an object header for an object in a runtime environment. Using an object reference that points to a location immediately after the header in memory, negative offsets are used to reference the header. Thus, fields at the beginning of the header can be optional.

When fields are optional, the presence of these optional fields is determined by an object type identifier, which provides the size of the object header.

In one embodiment, object header 400 contains LENGTH field 410 that indicates the number of elements in an array. Field 410 is present for array object types only. Object header 400 also contains LIST PREVIOUS field 420 and LIST NEXT filed 430. Fields 420 and 430 are used by a memory management system to maintain groups of objects with similar properties, such as objects with no references from the object heap.

In one embodiment, REFCOUNT/REF BITS field 440 indicate the number of references to object 400 from the object heap. The REFCOUNT portion of field 440 is large enough to accommodate the maximum number of references possible. The REF BITS portion of field 440 is used to determine if a finalizer resurrected the object, and otherwise to determine if the finalizer has been run.

In one embodiment, SYNC COUNT/ROOT SCAN ID field 450 contains synchronization count information that is used by a monitor lock for the associated object. Field 450 also contains root scan identifier information that is used to determine if an object is a member of the root scan set for purposes of garbage collection. In one embodiment, the synchronization count field and the root scan identifier field share the same memory word. The root scan identifier stores an identifier for the last thread whose stack was scanned and found to reference the associated object. In one embodiment, the root scan identifier is an integer not an object reference.

When the synchronization count portion of field 450 is non-zero, the root scan identifier portion of field 450 is used instead to indicate which thread has the object lock. Thus, when a stack scan for roots is performed objects that are locked do not get their root scan identifier updated as they otherwise would. OBJECT TYPE IDENTIFIER field 460 is used to determine the type of the associated object and is also used to provide access to meta-data used to perform method dispatch and other services of the object.

Following the object header is the object data. In one embodiment, the data is laid out first with base classes and then with sub-classes. The object data is grouped by size and alignment, and the groups are laid out according to the alignment needs of the platform on which the runtime environment exists. Any memory padding inserted prior to a group is set to zero.

The runtime environment of the present invention provides two types of method (e.g., routine, subroutine) dispatch. Direct dispatching can be used when the target method set consists of a single method. A direct call instruction is used to call the method. This can be accomplished, for example, with self-modifying code.

Virtual dispatch is used to select a target method from a target method set by fetching the target method's address from a method entry array. Virtual dispatch is the most general type of dispatch. Virtual dispatch can be accomplished by use of a v-table or any other manner known in the art.

In one embodiment, the runtime environment of the present invention employs inlining to reduce method dispatch overhead and stack use. Inlining can be accomplished, for example, by replacing a call to a method with the code contained in the method. Also, inlining can be accomplished by eliminating intermediate subroutine calls, where a called subroutine only calls another subroutine. In this situation, the intermediate calls can be eliminated such that the highest level subroutine directly calls the subroutine that is used for computational purposes.

Overview of a Calling Convention in a Runtime Environment

The runtime environment of the present invention includes a calling convention that partitions processor registers into volatile and non-volatile registers. The volatile registers are saved by the calling routine (caller saves). The non-volatile registers are saved by the called routine (callee saves). Both the volatile and the non-volatile registers are further partitioned into reference and non-reference registers.

Partitioning of the volatile register set removes the need for register use table that describe how a code generator uses the registers for evaluation and parameter passing. This partitioning performed before runtime and is static during runtime. In one embodiment, the volatile register partition includes 16 registers. Of the 16 registers, 8 registers are reference registers and 8 registers are non-reference registers. Of course, the volatile register set can include a different number of registers and the ratio of reference to non-reference registers can be different.

Partitioning of the non-volatile register set is dynamic at compile time within routines and sub-routines. Thus, the number of non-volatile reference registers and non-volatile non-reference registers is determined at the time each routine or sub-routine is compiled. Partitioning of non-volatile registers is based on data flow analysis and can be performed for each object, routine, or subroutine compiled. In one embodiment, 16 non-volatile registers are included in the non-volatile register set. Of course, a different number of registers can be used.

Figure 5:
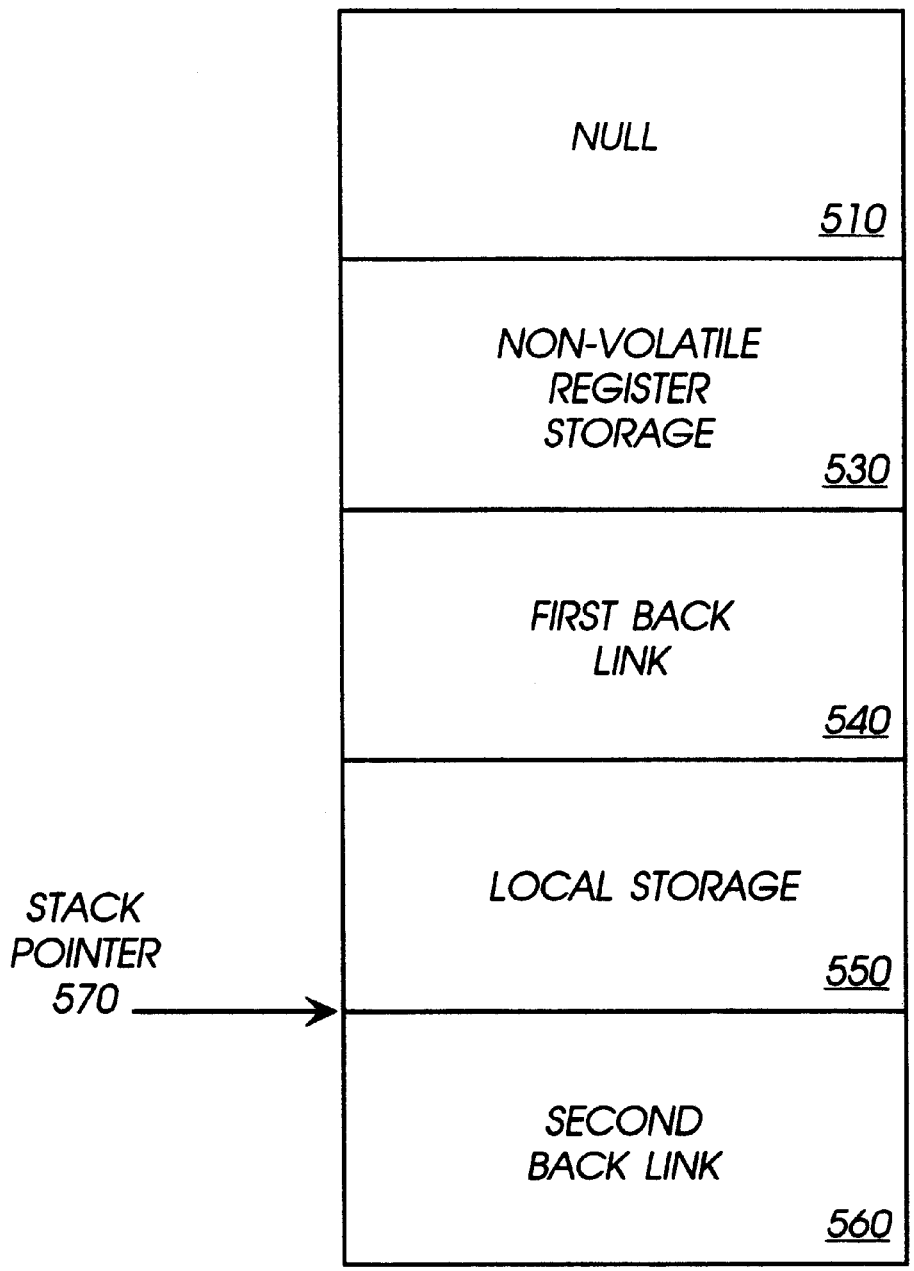
FIG. 5 is one embodiment of a stack frame using the calling convention of the present invention within a runtime environment.

FIG. 5 is one embodiment of a stack frame using the calling convention of the present invention within a runtime environment. The stack of FIG. 5 shows a single frame configured as two half-frames. Of course, the stack can have any number of frames. The use to two half--frames in a dual back-link configuration provides a window of time in which to change non-volatile register partitioning upon entering a sub-routine.

In one embodiment, the dual back-link frame has an additional overhead of one instruction per sub-routine call and one additional instruction per sub-routine return over prior art single back link frames. The additional overhead for sub-routine returns is performed in millicode, which results in instruction sequences as short as one instruction.

In one embodiment, the first frame of subroutine calls are performed by millicode that is configured to appear atomic to a garbage collection application. Subroutine calls performed according to the present invention can be accomplished without a branch within the millicode. Thus, control can be maintained within the millicode to appear atomic to garbage collection applications.

By storing subroutine millicode in a known location in memory, page faults and other memory related interrupts can be avoided. If a garbage collection interrupt does occur during millicode execution, the interrupt can be ignored until millicode execution completes, or the millicode that has been executed can be reversed.

In one embodiment, where registers are not initialized to null during subroutine calls, the program counter is set to the beginning of the millicode and the interrupt is serviced. After the interrupt is serviced, the millicode is executed from the beginning. If registers are initialized to null during subroutine calls, the program counter is set the beginning of the millicode and the register values are restored from the stack prior to interrupt service.

In general, when a callee routine uses the stack, after control transfers to the callee routine, the callee routine saves the non-volatile registers that are to be used. The non-volatile registers are saved in non-volatile register storage area 530 in stack 500. It should be noted that the partitioning of the caller routine is not relevant to the registers saved by the callee routine. In other words, non-volatile registers used for reference values by the caller routine can be used for either reference or non-reference values by the callee routine. Similarly, non-volatile registers used for non-reference values by the caller routine can be used for either reference or non-reference values by the callee routine.

In one embodiment, after saving non-volatile registers, the callee routine creates first back link 540 that points to the stack location immediately preceding the new stack frame. In stack 500, first back link 540 points to null 510. This is because stack 500 contains a single frame. In a stack with multiple frames, first back link 540 points to the end (i.e., second back link) of the frame immediately preceding the new frame. First back link 540 "brackets" saved non-volatile registers 530 in a half-frame. The creation of first back link 540 opens a window that closes with the creation of second back link 560. This window is used to establish the new contents of the non-volatile registers according to the partitioning of the callee routine.

After the non-volatile registers of the callee routine have been set up according to the new partitioning and local storage area 550 has been established, second back link 560 is created, which finishes the frame and closes the window. Second back link 560 is a pointer to first back link 540.

Stack pointer 570 points to the end of the frame, which is second back link 560. Local storage 550 is used as a stack by the callee routine for storing both reference and non-reference values. In one embodiment, local storage area 550 is partitioned into reference and non-reference segments Local storage area 550 includes a mask that describes the partitioning of the non-volatile registers in the caller routine. In one embodiment, the mask includes 16 bits corresponding to 16 non-volatile registers. A bit is set if the corresponding registers is a reference register. A bit is cleared if the corresponding register is a non-reference register. The bit is cleared if the corresponding register is a reference register. Of course, other types of masks can be used for different numbers of non-volatile registers and different reference/non-reference partitions. Alternatively, a split value can be used to indicate which registers store reference values and which registers store non-reference values. For example, a split value of 7 indicates that registers 0–7 store reference values and registers 8–16 store non-reference values.

Figure 6:
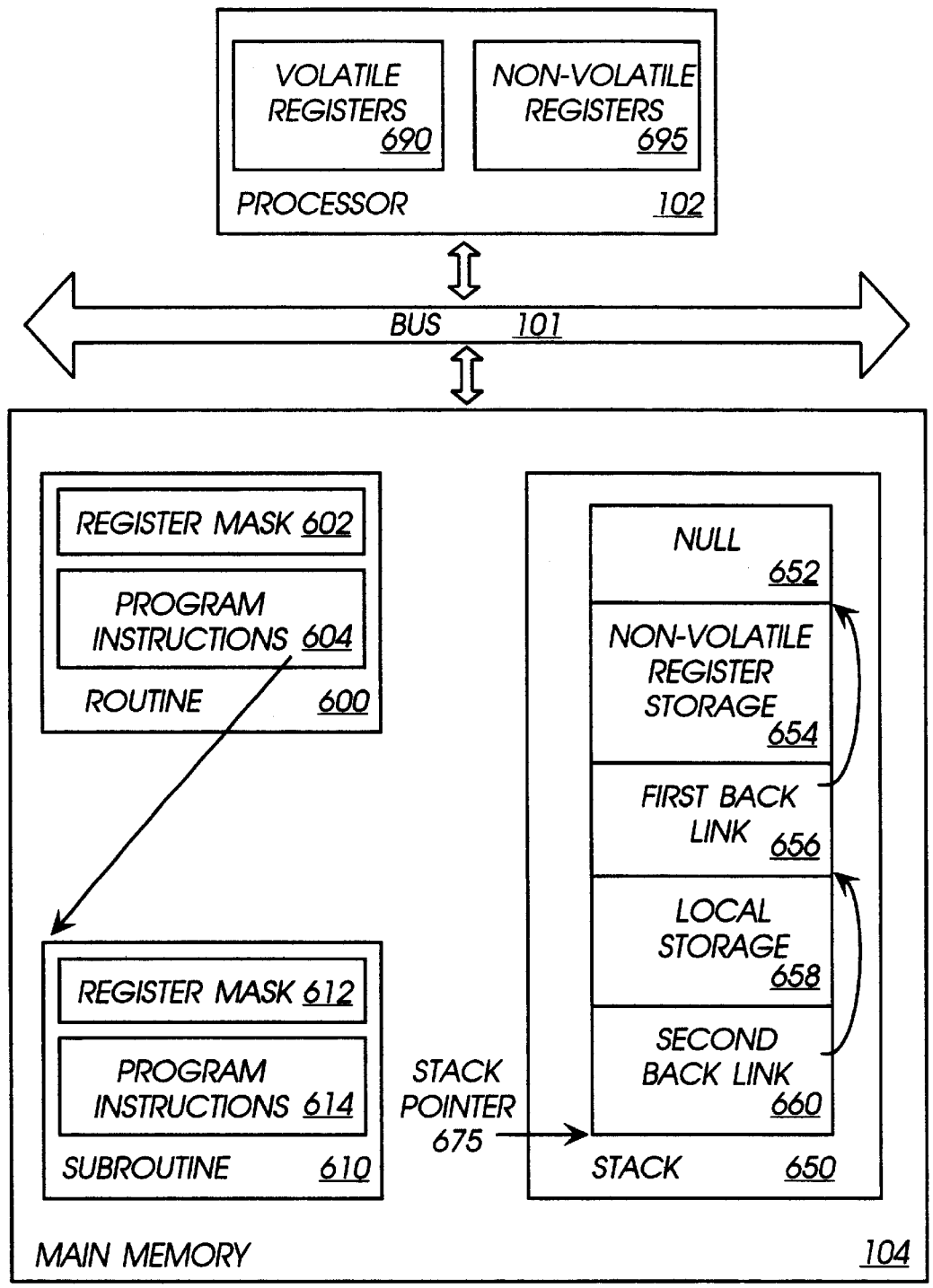
FIG. 6 is one embodiment of a computer system is which a routine calls a subroutine.

FIG. 6 is one embodiment of a computer system in which a routine calls a subroutine. For simplicity, FIG. 6 is described in terms of a routine calling a subroutine; however, the calling convention described can be used with any number of subroutine calls. Additional subroutine calls are accomplished in the same manner by adding frames to the stack. This can continue until the stack is depleted. At that time a garbage collection routine or other memory management procedure can be used to reclaim unused memory and/or stack space.

Processor 102 includes volatile registers 690 and non-volatile registers 695, each of which is further partitioned into reference and non-reference registers in the manner described above. Processor 102 executes routine 600 stored in main memory 104. Routine 600 comprises sequences of program instructions 604 that are executed by processor 102. Program instructions 604 are communicated to processor 102 by bus 101.

Routine 600 also includes register mask 602 that contains information about reference/non-reference register partitioning for routine 600. When routine 600 is invoked, processor 102 begins execution of program instructions 604. Non-volatile registers 695 are used for reference and non-reference values according to register mask 602.

One of the program instructions included in program instructions 604 makes a subroutine call. The instruction can be, for example, a conditional branch instruction, an unconditional branch instruction, etc. The subroutine call invokes subroutine 610 that is located in a different location in main memory 104 than routine 600. Subroutine 610 includes register mask 612 and program instructions 614.

When called, subroutine 610 saves the contents of non-volatile registers 695 on stack 650 at location 654. After non-volatile registers 695 are placed on stack 650 in non-volatile register storage area 654, subroutine 610 creates first back link 656 that points to null location 652. It is important to note that first back link 656 points to null location 652 only for the first subroutine call. For subsequent subroutine calls, first back link 656 points to the end of the previous stack frame (i.e., the second back link of the previous stack frame). Saved non-volatile registers 654 and first back link 656 comprise a first half frame of a stack frame created for calling subroutine 610.

In one embodiment, first back link 656 is not a pointer, but is register mask 612 for the callee subroutine. Register mask 612 specifies the number of non-volatile registers used by the subroutine and the stack reference/non-reference partitioning. Register mask 612 encoding provides the information needed to determine where first back link 656 would point if it were a pointer.

In one, embodiment, the registers having values stored in the first half frame are initialized to null after the values are stored on the stack. Alternatively, a valid reference value can be copied to the register. Reference values can be obtained, for example, from a parameter value being passed to a subroutine. Copying of a parameter value provides a faster initialization than initializing the register values to null. However, copying of parameter values requires that garbage collection wait until the stack frame is complete.

In one embodiment, after first back link 656, subroutine 610 creates local storage area 658, if necessary. The last location in local storage area 658 stores register mask 612. The remainder of local storage area 658 is for computational or other use by subroutine 610. If volatile registers 690 and non-volatile registers 695 provide enough storage locations, local storage area 658 contains only register mask 612. Subroutine 610 then creates second back link 660 that points to first back link 656. Local storage area 658 and second back link 660 comprise the second half frame for subroutine 610.

The combination of the first half frame and the second half frame result in a stack frame for calling subroutine 610. In one embodiment, returning from subroutine 610 to routine 600 is the reverse procedure of the call of subroutine 610 from routine 600. Stack pointer 675 is moved from second back link 660 to first back link 656. The stack locations used for local storage area 658 and second back link 656 are returned to stack 650 for future use. Register mask 602 stored in local storage area 658 is used to restore the values stored in non-volatile register storage area 654 to the appropriate non-volatile registers 695.

Stack pointer 675 is moved from first back link 656 to null 652. If multiple subroutine calls had been made, stack pointer 675 points to the second back link of a previous frame rather than null location 652. The stack locations used for first back link 656 and non-volatile register storage area 654 are returned to stack 650 for future use.

Overview of Garbage Collection in a Runtime Environment

The runtime environment of the present invention provides support for any type of non-conservative garbage collection by distinguishing between reference and non-reference values stored in registers and on the stack. By providing an indication of which values are reference values, the garbage collector can check references to objects in memory and determine whether the reference is alive or if the object is garbage. Thus, the garbage collector can collect all garbage to provide more memory for use in the computer system than would otherwise be possible.

In providing dynamic repartitioning of registers and memory locations in a system that supports interrupt driven (or asynchronous) garbage collection, there are two important issues. First, determining how many non-volatile registers have been saved during entry into a subroutine. In other words, how far along the entry code has been executed. Second, determining how far along the initialization process that establishes new values for use by the called subroutine has been executed. While described in terms of entry code for a particular subroutine, the present invention applies equally to exit code from a calling subroutine that performs similar functions.

If a subroutine has executed entry code at the time of an interruption, ordinary interrupt processing can be used. Determination of reference and non-reference values can be accomplished by using the mask stored in the stack frame and walking back over the stack frame(s). If a subroutine is executing entry code when it is interrupted, the entry code can either be allowed to complete execution or it can be restarted after the interrupt is processed, as described in greater detail below.

The present invention provides a mechanism to determine whether interrupted code is entry code by use of half frames to build a stack frame for the callee subroutine. Use of half frames eliminates the need for external table generated during compilation to provide information as to whether entry code has been interrupted.

Use of half frames simplifies determination of whether entry code has been interrupted because the top item on the stack can be used to indicate whether a stack frame is complete. In one embodiment, if the top item on the stack is an odd number (e.g., the least significant bit is set), the item is a register mask and the stack frame has not been completed. If the top item on the stack is an even number (e.g., the least significant bit is clear), the item is a second back link and the stack frame has been complete. A complete stack frame corresponds to completed entry code. Of course, bits other than the least significant bits may be used to indicate whether the top item on the stack corresponds to a complete stack frame.

If the top item on the stack is an odd value, entry code has been interrupted. In one embodiment, entry code is allowed to complete execution before the interrupt is serviced. Alternatively, entry code can be "backed up" to the beginning and re-executed after the interrupt has been serviced. Backing up the entry code allows a garbage collection routine to any value designated as non-volatile because the values have not been initialized. The values can be reference values from the calling (sub)routine, but these values have been saved in the stack and the registers, so the garbage collection routine can safely ignore these values.

To back up entry code, after the entry millicode is invoked to save non-volatile registers, the return address used by the millicode is saved until the second back link is created. The return address is the location that is backed up to when entry code is backed up. In one embodiment, backing up can cause some initializations to be performed more than once, therefore, initialization code has no side effects other than setting of initialized values. If initialization cannot be performed without side effects, values are initialized to null.

In one embodiment, using a Reduced Instruction Set Computing (RISC) processor, the return address is stored in a specific register. Storing the return address in a specific register makes determination and access to the return address easily and quickly obtainable.

In summary, when an interrupted thread is scanned (e.g., by a garbage collector), the scanning routine finds either: (1) a completely initialized stack where the stack frame is complete including a register mask and the processor registers correspond to the mask; or (2) interrupted entry code performing initialization functions.

Interrupted entry code can be backed up to the beginning of the entry code. After the thread is scanned, the entry code is re-executed as if the code had not been interrupted. Exit code can be handled in the same manner. Alternatively, the incomplete entry code can be allowed to complete execution prior to scanning.

Figure 7:
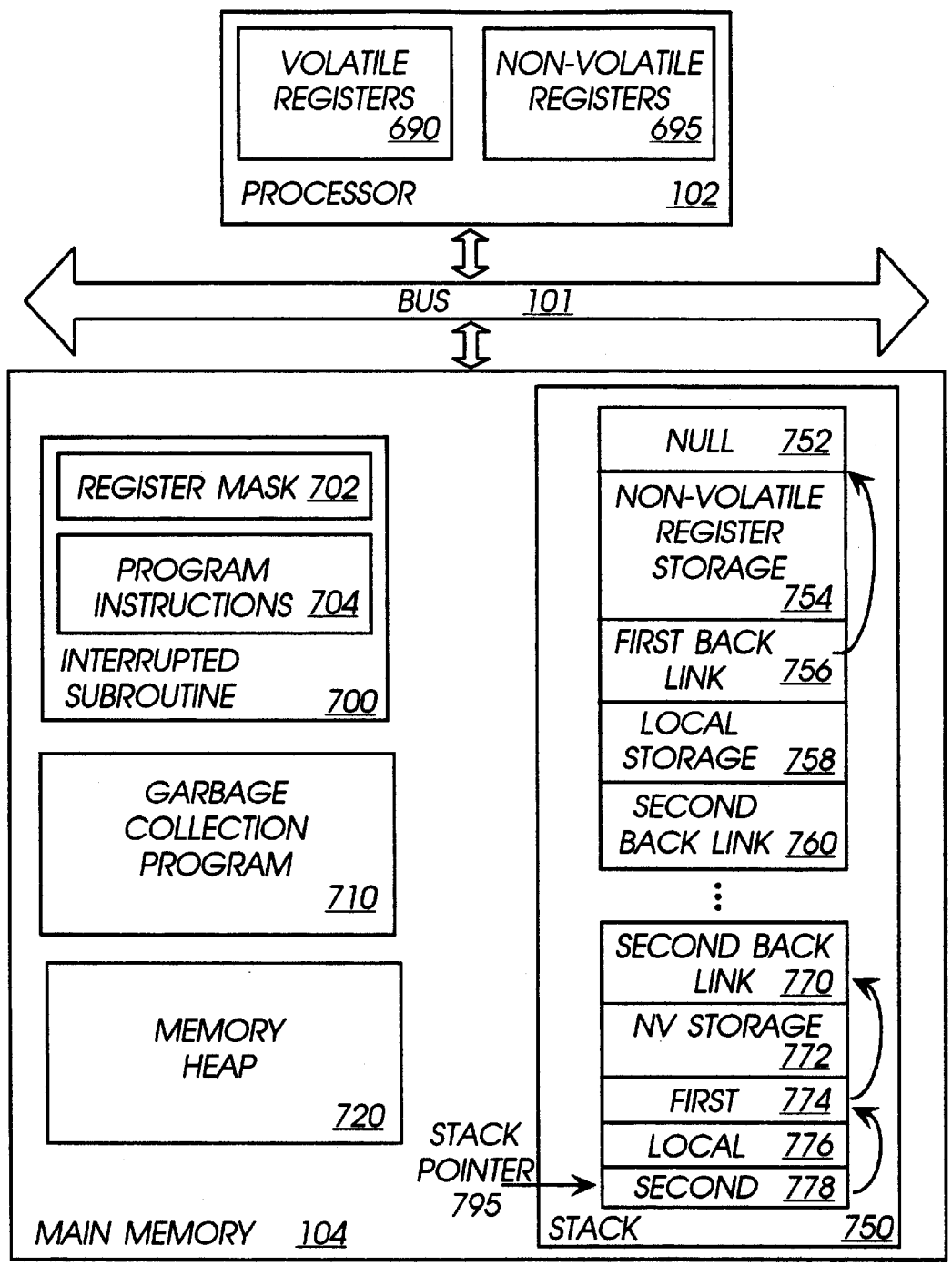
FIG. 7 is one embodiment of a computer system in which a garbage collection program.

FIG. 7 is one embodiment of a computer system in which a garbage collection program is running. In one embodiment, garbage collection is provided by an independent program. The runtime environment of the present invention provides support for any type of garbage collection. In a byte code runtime environment, for example, a copying garbage collector can be used. In a more traditional runtime environment, for example, a reference counting garbage collector can be used.

Processor 102 includes volatile registers 690 and non-volatile registers 695. Processor 102 executes program instructions for one or more routines or subroutines called in the manner described above with respect to FIG. 6. When processor 102 receives an interrupt or other event that causes garbage collection to occur, execution of interrupted subroutine 700 is suspended. Interrupts that cause garbage collection to occur can be, for example, an interrupt indicating that available heap memory is below a certain threshold level, a periodic garbage collection interrupt, etc.

In response to the interrupt causing garbage collection to occur, processor 102 executes garbage collection program 710. In one embodiment, garbage collection program 710 is an independent program; however, garbage collection program 710 can be part of a larger application program. Garbage collection halts execution of a thread executed by processor 102. Execution is halted so that memory locations and registers that have been examined by garbage collection program 710 do not change between examination and completion of garbage collection. Garbage collected by garbage collection program 710 is place in memory heap 720 and is available for used when execution is resumed by processor 102.

In one embodiment, garbage collection program 710 counts the number of back links in stack 750. If the number of back links is even, all subroutine calls have been completed. If the number of back links is odd, a subroutine call has been started, but has not yet been completed. If garbage collection occurs before the second half frame of a subroutine call is completed, the subroutine call is restarted from the beginning after completion of garbage collection.

In an alternative embodiment, the number of back links is not counted to determine whether an even number of back links exist on the stack. Instead a set of bits of the register mask are used to determine whether a stack frame is complete. Such an embodiment can be used with small objects and does not require the second back link.

The calling convention of the present invention is interrupt safe. If an interrupt occurs during the time the first half frame is being established in the stack, the values in non-volatile registers 695 have not been eliminated, so the values are maintained. If an interrupt occurs the second half frame has been completed, values from non-volatile registers 695 exist in both non-volatile registers 695 and stack 750. If an interrupt occurs after the second frame has been completed, register mask 702 for interrupted subroutine 700 is stored in the second half frame, which allows values from the non-volatile storage area to be used to restore non-volatile registers 695. Thus, the calling convention of the present invention provides support for garbage collection interrupts at any time during subroutine calls.

Garbage collection program 710 reads the register mask for a particular subroutine from the stack frame to determine which register values stored in the corresponding non-volatile register storage area are reference values and which are non-reference values. In one embodiment, set bits indicate that corresponding registers store reference values. The reference values are examined to determine whether the associated objects in memory are live. If a register or storage item is null, it is ignored by the garbage collector. Otherwise, the item referred to is live.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A method of distinguishing reference values from non-reference values in a runtime environment comprising:
   statically determining a set of volatile registers and a set of non-volatile registers;
   statically determining a partition of the set of volatile registers into reference and non-reference partitions; and
   dynamically determining a partition of the set of non-volatile registers into reference and non-reference partitions.

2. The method of claim 1, wherein dynamically determining a partition is performed for each subroutine.

3. The method of claim 1, wherein one or more reference registers store a pointer either directly or indirectly to an object in memory.

4. A machine-readable medium having stored thereon data representing a sequence of instructions, the sequence of instructions which, when executed by a processor cause the processor to:
   statically determine a set of volatile registers and a set of non-volatile registers;
   statically determine a partition of the set of volatile registers into reference and non-reference partitions, and
   dynamically determine a partition of the set of non-volatile registers into reference and non-reference partitions.

5. The machine-readable medium of claim 4, wherein dynamically determining a partition is performed for each subroutine.

6. A computer system comprising:
   means for statically determining a set of volatile registers and a set of non-volatile registers;
   means for statically determining a partition of the set of volatile registers into reference and non-reference partitions; and
   means for dynamically determining a partition of the set of non-volatile registers into reference and non-reference partitions.

7. The computer system of claim 6, wherein the means for dynamically determining a partition of volatile registers determines partitioning on a routine by routine basis.

8. The computer system of claim 6, wherein the dynamic partition is indicated by a mask having a bit associated with each non-volatile register.

9. A computer system comprising:
   a bus;
   a processor coupled to the bus, the processor having a set of registers, wherein the set of registers is partitioned into volatile and non-volatile registers, and further wherein the volatile registers are further partitioned into reference and non-reference registers; and
   memory coupled to the bus, the memory storing a plurality of objects;
   wherein the non-volatile registers are dynamically partitioned at compile time into reference and non-reference registers based on data flow analysis of the objects in memory.

10. The computer system of claim 9, wherein the non-volatile registers are dynamically partitioned into reference and non-reference registers for each object in memory based on data flow analysis of the particular object in memory.

11. The computer system of claim 10, wherein the objects are received as a series of byte codes.

12. A method of collecting garbage in a computer system comprising:
   a) Reading a register mask for a particular subroutine to determine a set of reference values stored on a stack;
   b) determining whether the reference values stored on the stack correspond to a live object in memory;
   c) counting back links stored on the stack to determine whether one or more of the subroutine calls have been completed; and
   d) restarting initialization of reference values if the number of back links stored on the stack is an odd number.

13. The method of claim 12, wherein a) and b) are repeated for each of a plurality of subroutines placing values on the stack.

14. The method of claim 12, wherein the register mask is determined dynamically at compile time based on data flow analysis of a corresponding subroutine.

15. The method of claim 12, wherein a top value on the stack is used to determine whether processing of a corresponding stack frame has been completed.

16. A method of calling a subroutine in a computer system comprising:
   a) storing contents of a set of non-volatile registers on a stack;
   b) storing a first back link indicating a stack location preceding the set of non-volatile registers; and
   c) designating a set of stack locations for storing a first predetermined number of reference values and a second predetermined number of non-reference values.

17. The method of claim 16 further comprising storing a back link on the stack that points to the first back link.

18. The method of claim 16, wherein the first back link includes a mask value that indicates a partitioning of the non-volatile registers indicating reference values and non reference values.

19. The method of claim 16, wherein an interrupt occurring during any of a), b) and c) causes any of a), b) and c) that have been performed to be reversed and performed again after the interrupt has been serviced.

20. The method of claim 16, wherein an interrupt occurring during any of a), b) and c) is serviced after the storing of the second back link.

21. A computer-readable medium having stored thereon data representing a sequence of instructions, the sequence of instructions which, when executed by a processor, cause the processor to:

a) store contents of a set of non-volatile registers on a stack;

b) store a first back link indicating a stack location preceding the set of non-volatile registers; and c) designate a set of stack locations for storing a first predetermined number of reference values and a second predetermined number of non-reference values.

22. The computer-readable medium of claim 21, wherein the first back link includes a mask value that indicates a partitioning of the non-volatile registers indicating reference values and non reference values.

23. The computer-readable medium of claim 21 further comprising storing a back link on the stack that points to the first back link.

24. The computer-readable medium of claim 21, wherein an interrupt occurring during any of a), b) and c) causes any of a), b) and c) that has been performed to be reversed and performed after the interrupt has been serviced.

25. The computer-readable medium of claim 21, wherein an interrupt occurring during any of a), b) and c) is serviced after the storing of the second back link.

26. A computer data signal embodied received via a data communications medium comprising sequences of instructions that, when executed, cause one or more electronic systems to:

statically determine a set of volatile registers and a set of non-volatile registers;

statically determine a partition of the set of volatile registers into reference and non-reference partitions; and dynamically determine a partition of the set of non-volatile registers into reference and non-reference partitions.

27. The computer data signal embodied in the data communications medium of claim 26 further wherein dynamically determining a partition is performed for each subroutine.

28. A computer data signal embodied received via a data communications medium comprising sequences of instructions that, when executed, cause one or more electronic systems to:

a) store contents of a set of non-volatile registers on a stack:

b) store a first back link indicating a stack location preceding the set of non-volatile registers; and;

c) designate a set of stack locations for storing a first predetermined number of reference values and a second predetermined number of non-reference values.

29. The computer data signal embodied in the data communications medium of claim 28, wherein the first back link includes a mask value that indicates a partitioning of the non-volatile registers indicating reference values and non-reference values.

30. The computer data signal embodied in the data communications medium of claim 28 further comprising sequences of instructions that, when executed, cause the one or more electronic devices to store a back link on the stack that points to the first back link.

31. The computer data signal embodied in the data communications medium of claim 28, wherein an interrupt occurring during any of a), b) and c) causes any of a), b) and c) that has been performed to be reversed and performed after the interrupt has been serviced.

32. The computer data signal embodied in the data communications medium of claim 28, wherein an interrupt occurring during any of a), b) and c) is serviced after the storing of the second back link.

* * * * *